April 7, 1942.  R. H. HYDE  2,278,447
WATER PIPE JOINT
Filed June 3, 1940
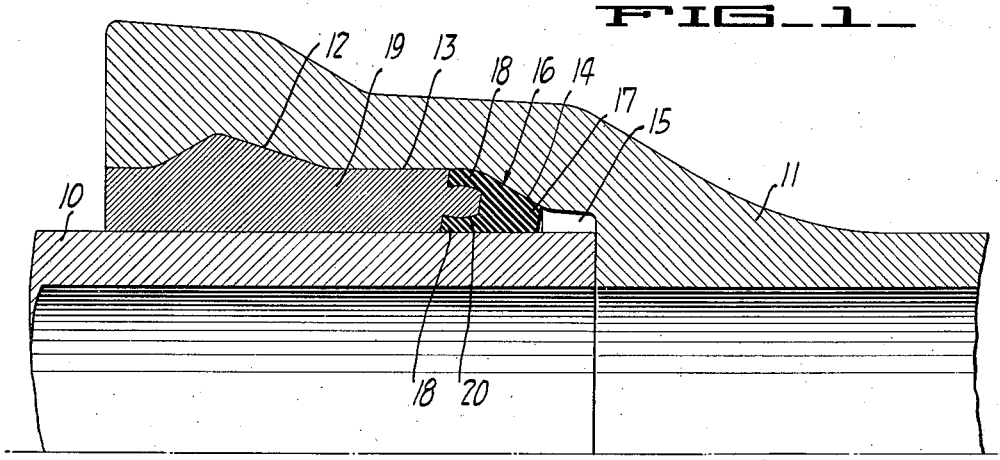
FIG_1_
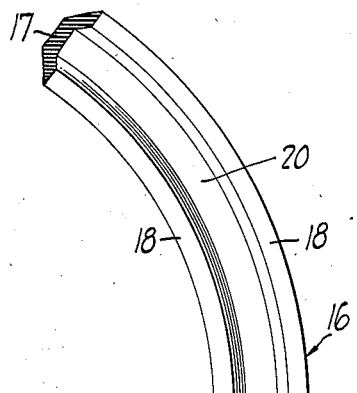
FIG_2_
FIG_3_
FIG_4_
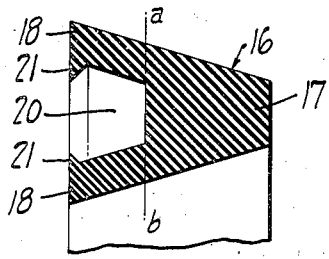
INVENTOR
Ralph H. Hyde
BY Harper Allen
ATTORNEY Patented Apr. 7, 1942

2,278,447

UNITED STATES PATENT OFFICE 2,278,447

WATER PIPE JOINT

Ralph H. Hyde, Campbell, Calif.

Application June 3, 1940, Serial No. 338,452

2 Claims. (Cl. 285—115)

This invention relates to a sealing connection for the joints of water pipes, and is concerned more particularly with the provision of an improved sealed joint of the character referred to.

It is an object of the invention to provide an improved sealed joint for water pipes which can be easily installed and which will not harbor bacteria.

Another object of the invention is to provide an improved form of resilient sealing ring for use in joining the pipes of water mains.

Other objects and advantages of the invention will be apparent from the following description of certain preferred embodiments thereof as illustrated in the accompanying drawing, in which:

Figure 1 is a fragmentary sectional view through the bell and spigot joint of a water main having the sealing means of the instant invention in place.

Figure 2 is an enlarged sectional view of the rubber sealing ring.

Figure 3 is a fragmentary plan view of the sealing ring.

Figure 4 is a view similar to Figure 2 showing a modified form of the sealing ring.

One of the principal problems involved in the laying of water mains is the provision of sealed joints at the bell and spigot connections which are of a sterile character or easily sterilized so that they will not harbor or feed bacteria. In accordance with conventional practice, when the spigot is inserted within the bell in laying the water main a length of braided hemp or jute is caulked into place around the spigot and within the bell after which the space within the bell is filled with molten lead, "mineral lead," or some similar metal jointing medium which can be poured in place while melted and then allowed to harden. Considerable difficulty has been encountered with this type of sealed joint because it is very difficult to obtain uncontaminated jute or hemp packing and because the packing is exposed to the water so that it easily picks up and feeds any bacteria which may be in or carried through the pipe. In many instances, jute or hemp sealed joints have resisted sterilization for many weeks, causing delay in use of the water mains and expense to the water companies.

In accordance with the instant invention, a rubber sealing ring is employed for closing the annular space between the spigot and bell of the adjacent pipe ends which is specially constructed to provide a locked joint with the metal jointing medium. In this way a sterile sealed joint can be provided which provides no nesting place for bacteria and which is easily installed in laying the main.

Referring to the drawing, a water pipe joint is disclosed including a spigot end 10 of one pipe and a bell end 11 of second pipe with the spigot telescoped within the bell. In accordance with usual practice the bell is provided with an internal annular locking groove 12 formed in an internal cylindrical surface 13 which tapers at 14 to a reduced cylindrical portion 15 forming a guide for centering the spigot end 10. In other conventional forms of pipe the taper 14 is omitted and a taper is provided on the spigot.

Associated with the spigot and bell ends of the pipes is an annular rubber sealing ring 16 which is generally U-shaped or wedge shaped. Ring 16 is provided with a tapered solid portion 17 and a pair of tapered annular flanges or skirts 18 whose outer surfaces before installation continue the taper of the solid portion 17.

Preferably the thickness of the ring at the line $a$—$b$ is substantially equal to the radial space between the cylindrical surface 13 of the bell and the outer cylindrical surface of the spigot.

The ring 16 is shown in place in Figure 1 together with a ring 19 of jointing material which may be formed of lead, "mineral lead," or any other suitable jointing substance which can be poured in place and allowed to harden. Because of the dimensioning of the sealing ring with respect to the annular space which it must seal, the sealing ring when driven or caulked in place is tightly wedged in the annular space between the pipes while the skirts 18 are bent inwardly to provide a locking recess 20 for a portion of the jointing metal 19. The convergence of skirts 18 is preferably such as to provide a restricted entrant portion for the locking recess. Thus the jointing metal 19 is locked with respect to the bell by filling the annular groove 12 and is also locked with respect to the sealing ring 16 by filling the annular locking recess 20 therein. The arrangement serves to definitely locate the sealing ring and positively maintain it in sealing position.

Figure 4 illustrates a modified construction wherein the inner edges of the skirts 18 may be provided with respective beads 21 which project inwardly to provide a more pronounced restriction for the locking groove for cooperation with the metal jointing material.

I claim:

1. A rubber sealing ring for installation between the bell and spigot ends of adjacent water pipe sections, said ring having a wedge-shaped cross-section and having annular skirts continuing the wedge-shape and providing an annular recess therebetween, said ring being so dimensioned with reference to the annular space between said bell and spigot ends that the annular skirts converge at their opposed edges when installed and said skirts having opposed beads formed therearound to provide a restriction at the entrant portion of said recess.

2. A rubber sealing ring for installation between the bell and spigot ends of adjacent pipes of a water main, said ring having a wedge-shaped cross-section with the narrower end thereof solid, the width of the ring at the wider end of the solid portion being substantially equal to the radial distance between the inner surface of the bell and the outer surface of the pigot, said ring having a pair of annular skirts continuing the wedge form of the solid portion whereby to be forced inwardly toward each other when installed in the pipe joint to provide a locking recess in the ring to receive the metallic jointing material associated therewith, said rings having annular beads at their opposed edges to provide a restricted entrant portion for said locking recess.

RALPH H. HYDE.